(12) United States Patent
Hiroki

(10) Patent No.: US 7,317,899 B2
(45) Date of Patent: Jan. 8, 2008

(54) COMMUNICATION APPARATUS

(75) Inventor: Shigeru Hiroki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 10/241,703

(22) Filed: Sep. 12, 2002

(65) Prior Publication Data

US 2003/0068021 A1 Apr. 10, 2003

(30) Foreign Application Priority Data

Oct. 10, 2001 (JP) ............................. 2001-312600

(51) Int. Cl.
*H04B 1/28* (2006.01)
*H04M 1/00* (2006.01)

(52) U.S. Cl. .................... 455/73; 455/566; 379/215.01

(58) Field of Classification Search ................ 455/566, 455/556.2, 412.1, 413, 414.1, 466, 517–521, 455/412.2, 415–418; 379/142.17, 142.08, 379/215.01
See application file for complete search history.

(56) References Cited

U.S. PATENT DOCUMENTS

| 5,754,636 A | 5/1998 | Bayless et al. .............. 379/142 |
| 5,857,017 A | 1/1999 | Ohi et al. .................... 379/157 |
| 5,926,770 A * | 7/1999 | Nishiyama ................ 455/575.1 |
| 6,009,338 A | 12/1999 | Iwata et al. .................. 455/575 |
| 6,067,355 A * | 5/2000 | Lim et al. ............... 379/142.14 |
| 6,070,068 A | 5/2000 | Sudo ........................... 455/414 |
| 6,188,754 B1 | 2/2001 | Kikuchi et al. .............. 379/114 |
| 6,424,711 B1 * | 7/2002 | Bayless et al. ......... 379/355.09 |
| 6,535,749 B1 * | 3/2003 | Iwata et al. .............. 455/556.2 |
| 6,608,637 B1 * | 8/2003 | Beaton et al. .............. 715/762 |
| 6,768,722 B1 * | 7/2004 | Katseff et al. .............. 370/260 |
| 6,798,872 B1 * | 9/2004 | Matsumoto et al. .... 379/142.01 |
| 6,868,283 B1 * | 3/2005 | Bonansea et al. ........... 455/566 |
| 2002/0002060 A1 * | 1/2002 | Singh et al. ................. 455/556 |

FOREIGN PATENT DOCUMENTS

| CN | 1270450 A | 10/2000 |
| EP | 0 898 424 A2 | 2/1999 |
| JP | 9298587 | 11/1997 |
| JP | 10042022 | 2/1998 |
| KR | 2001-17386 | 3/2001 |

* cited by examiner

*Primary Examiner*—Simon Nguyen
(74) *Attorney, Agent, or Firm*—Fitzpatrick, Cella, Harper & Scinto (57) ABSTRACT

A portable terminal device aborts a screen display process of the current application on a display in accordance with a switch of a communication partner during communication with a speaker A and executes a screen display process of an application corresponding to a speaker B after the switch operation. The application corresponding to the speaker B is the application executed during communication with the speaker B previously. The application is an E-mail or browser application.

23 Claims, 8 Drawing Sheets

| SPEAKER A | APPLICATION A (E-MAIL) |
|---|---|
| SPEAKER B | NONE |

COMMUNICATION APPARATUS

BACKGROUND OF THE INVENTION

1. Field of the Invention

The present invention relates to a communication apparatus capable of a switch of a communication partner.

2. Related Background Art

Some recent communication apparatuses such as portable terminal devices can execute an application of an E-mail, a browser, or the like as well as a voice call.

Some of these communication apparatuses can execute the application during a voice call. For example, a user can discuss a content of an E-mail by starting the E-mail application during communication with a communication partner. In addition, if the communication partner asks for time and place of a today's conference during communication, the user can start the E-mail application to read an incoming E-mail describing information of a content of the conference and to notify the communication partner of the time and place of the conference.

In recent portable terminal devices, it is also possible to execute a plurality of applications simultaneously.

A switch of a display screen on a display during execution of a plurality of applications can be made by depressing a function key singly or by depressing the key in combination with a cursor key, a dial key, or the like. Furthermore, in a frequently used application such as an E-mail or browser application, the display screen can be switched to an E-mail or browser screen only by depressing an E-mail key or an Internet key.

Network services include a speaker switch service for talking with a switch of a communication partner. In general, it is referred to as a call waiting.

Figure 2:
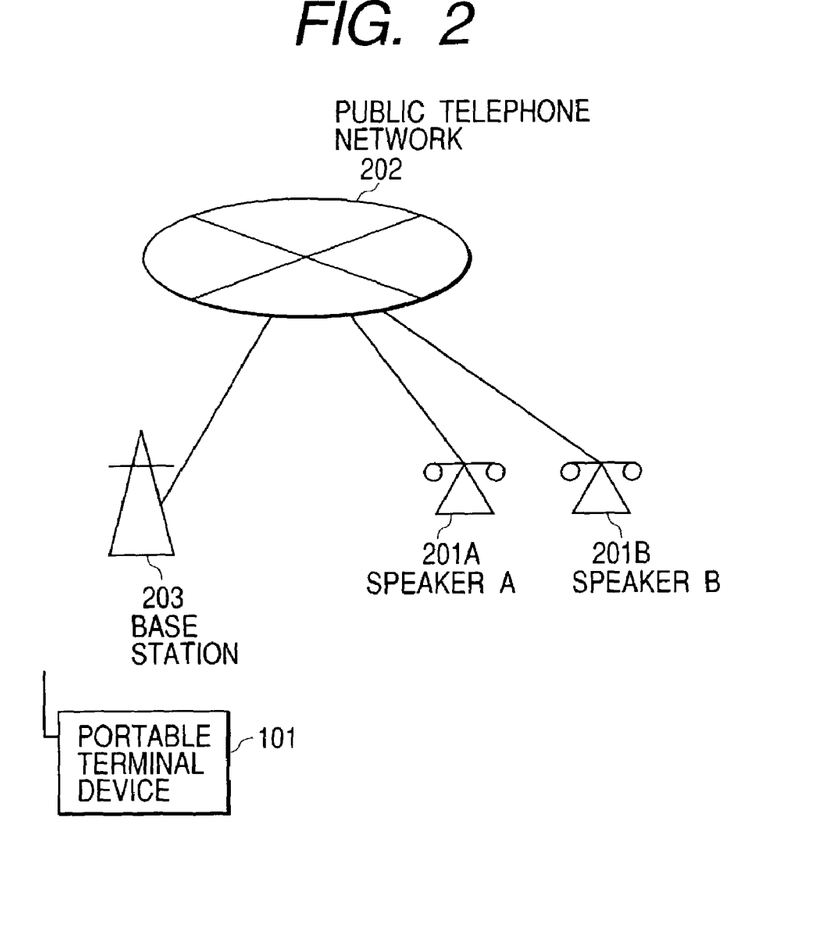
FIG. 2 is a system block diagram in which a speaker switch service is provided.

Referring to FIG. 2, there is shown a system block diagram in which a speaker switch service is provided.

Reference numerals 101, 201A, 201B, 202, and 203 designate a portable terminal device, a speaker A who is a first communication partner for a user of the portable terminal device 101, a speaker B who is a second communication partner for the user of the portable terminal device 101, a public telephone network for providing a speaker switch service, and a base station for wirelessly connecting the portable terminal device 101 to the public telephone network 202, respectively.

In execution of an application with a switch of a communication partner using the speaker switch service, the conventional portable terminal device has the following disadvantages.

For example, it is assumed that, when the user discusses a content of an incoming E-mail of an E-mail application with the speaker A (201A) while he or she discusses an Internet site with the speaker B (201B), he or she communicates with a partner switched between the speaker A (201A) and the speaker B (201B).

To change the communication partner to the speaker B (201B) during communication with the speaker A (201A) with displaying an incoming E-mail screen of the E-mail application on the display, depress a call/change key. This operation changes the communication partner from the speaker A (201A) to the speaker B (201B). The screen on the display, however, still shows the display of the application for the incoming E-mail as the E-mail application.

Since the user is discussing the certain Internet site with the speaker B (201B), he or she needs to make a further switch operation of the application to change the screen to a site screen of a browser application.

As mentioned above, the display screen on the display is enabled to change by depressing the function key singly, by depressing it in combination with the cursor key or the dial key, or by depressing the E-mail key or the Internet key. Therefore, at least two key depressing operations are necessary including the speaker switch operation.

Additionally, some communication apparatuses including a telephone set or a facsimile connected to a network with a fixed line can execute an E-mail or browser application. If the application is executed with a switch of a communication partner by using the speaker switch service in this type of apparatus, there is a need for two operations, a speaker switch operation and an application switch operation, as mentioned above.

Furthermore, in a communication apparatus capable of using two lines, a user can switch a communication partner without a network service. This type of communication apparatus also has the same disadvantages.

SUMMARY OF THE INVENTION

Therefore it is an object of the present invention to improve operability of a communication apparatus.

It is another object of the present invention to provide a communication apparatus capable of displaying an application screen according to a communication partner without an application switch operation when an application is executed with a switch of a communication partner.

Other objects of the present invention will become apparent from the following description of the embodiments.

BRIEF DESCRIPTION OF THE PREFERRED EMBODIMENTS

Figure 1:
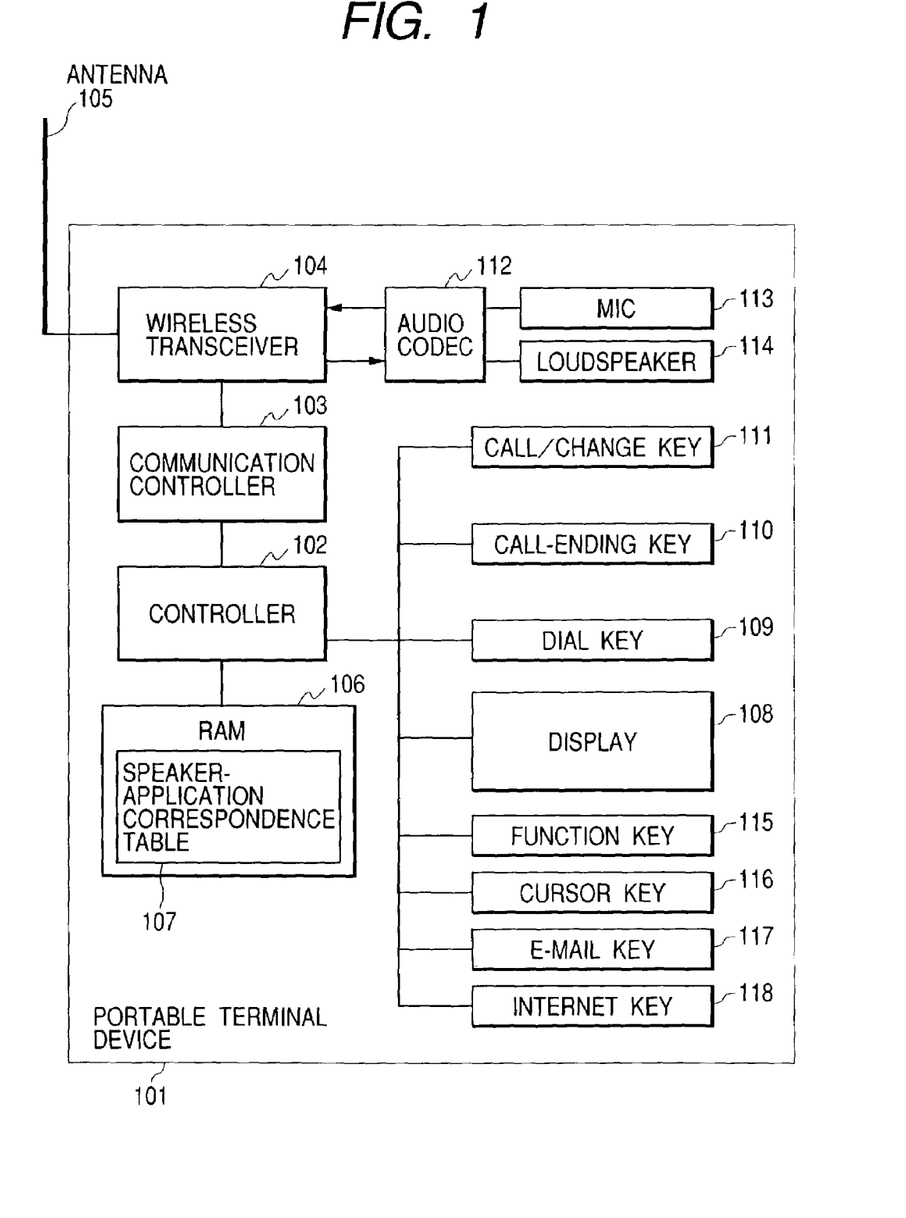
FIG. 1 is a block diagram showing a portable terminal device 101 according to the present invention.

Referring to FIG. 1, there is shown a block diagram of a portable terminal device according to the present invention.

There are shown a portable terminal device 101, a controller 102 of the portable terminal device 101, a communication controller 103 for controlling a radio communication protocol, a wireless transceiver 104, an antenna 105, a RAM 106 which is storage means, a speaker-application correspondence table 107, which is a storage area reserved in the RAM 106, for storing correspondence between speakers and applications, a display 108, a dial key 109 for a dial input, a call-ending key 110 for entering an end of a call, a call/change key 111 for starting a call or for changing a speaker, an audio CODEC 112 for encoding or decoding of audio data, a microphone 113, a loudspeaker 114, a function key 115, a cursor key 116, an E-mail key 117 for entering a start request of an E-mail application, and an Internet key 118 for entering a start request of a browser application. While there is shown an arrangement using a combined key both as a call key for starting a call and a change key for changing a speaker in this embodiment, the key can be separated into a call key and a change key. In this embodiment, the browser application is an application for viewing Web pages on the Internet.

In addition, while there will be described an arrangement of the portable terminal device for performing a radio communication with a network in this embodiment, the preset invention can also be worked in a communication apparatus that performs a cable communication with a network, such as a telephone or a facsimile.

Referring to FIG. 2, there is shown a system block diagram in which a speaker switch service is provided. There are shown a portable terminal device 101, a speaker A 201A who is a first communication partner for a user of the portable terminal device, a speaker B 201B who is a second communication partner for the user of the portable terminal device, a public telephone network 202 for providing a speaker switch service, and a base station 203 for wirelessly connecting the portable terminal device 101 to the public telephone network 202. While the present invention is described when it is worked in the portable terminal device 101 performing a radio communication with the base station 203 in this embodiment, the invention can also be worked in a telephone set connected to the network 202 with a fixed line as indicated by 201A and 201B. Furthermore, the present invention can be worked in a communication apparatus contained in an internal telephone network providing the speaker switch service.

Figure 10:
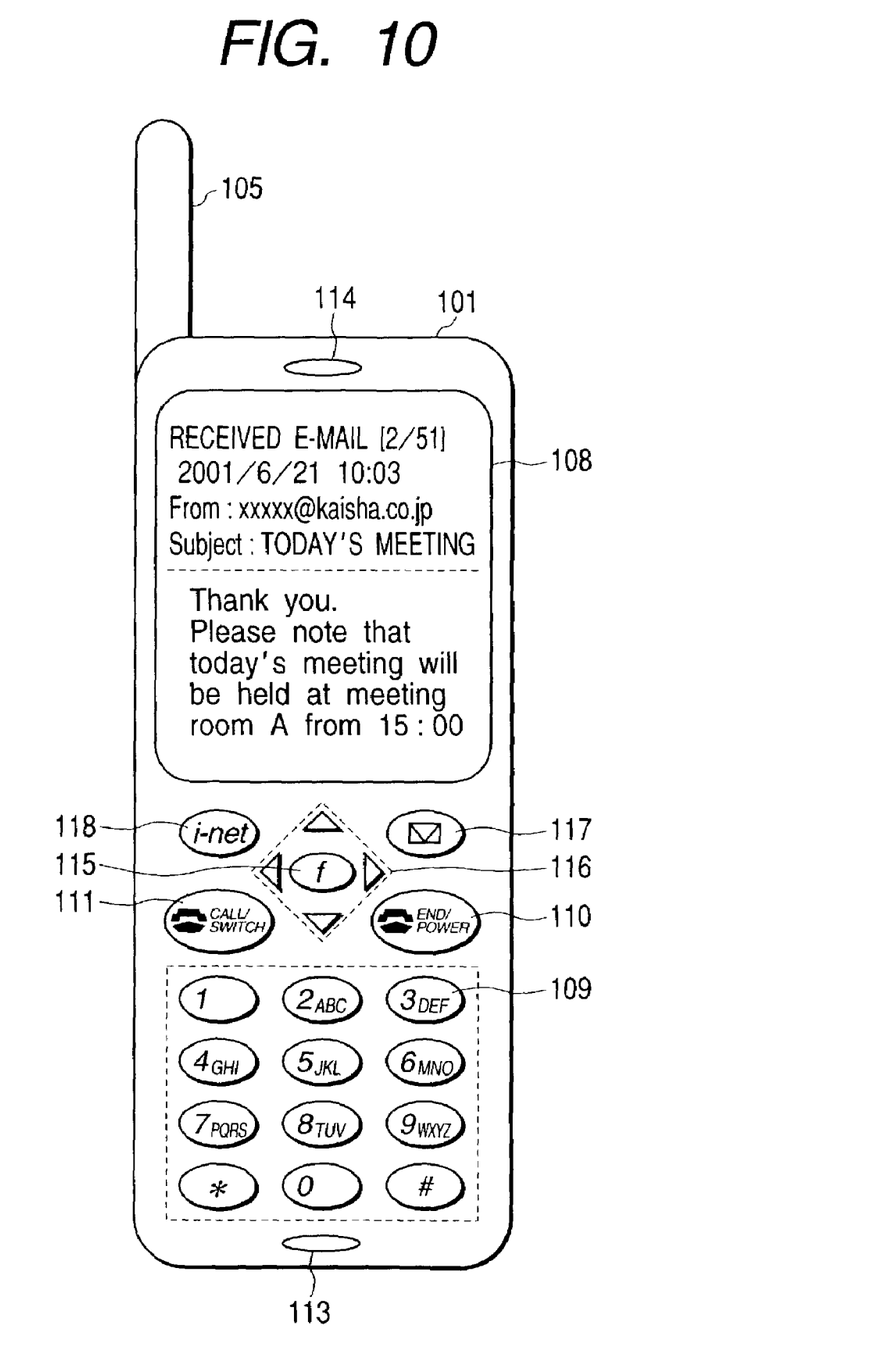
FIG. 10 is a schematic view of the portable terminal device.

Referring to FIG. 10, there is shown a schematic view of the portable terminal device capable of executing applications. In FIG. 10, an E-mail application is under execution and an incoming E-mail is displayed on the display 108.

Figure 3:
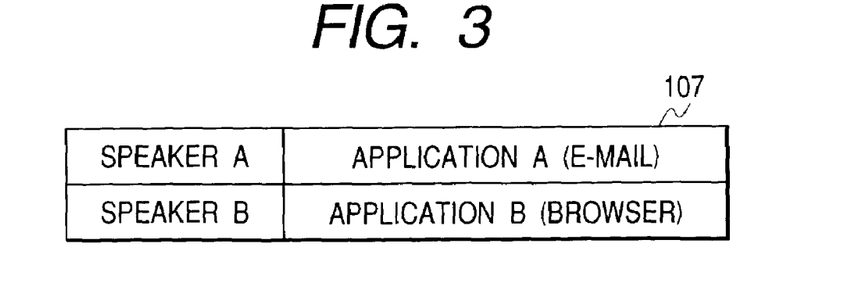
FIG. 3 is a diagram showing a speaker-application correspondence table 107.

Referring to FIG. 3, there is shown an example of the speaker-application correspondence table 107. In this example, the speaker A is associated with an E-mail application and the speaker B is with a browser application. A column of the speakers A and B contains names or phone numbers of the speakers A and B registered in a telephone directory area in the RAM 106.

Figure 4:
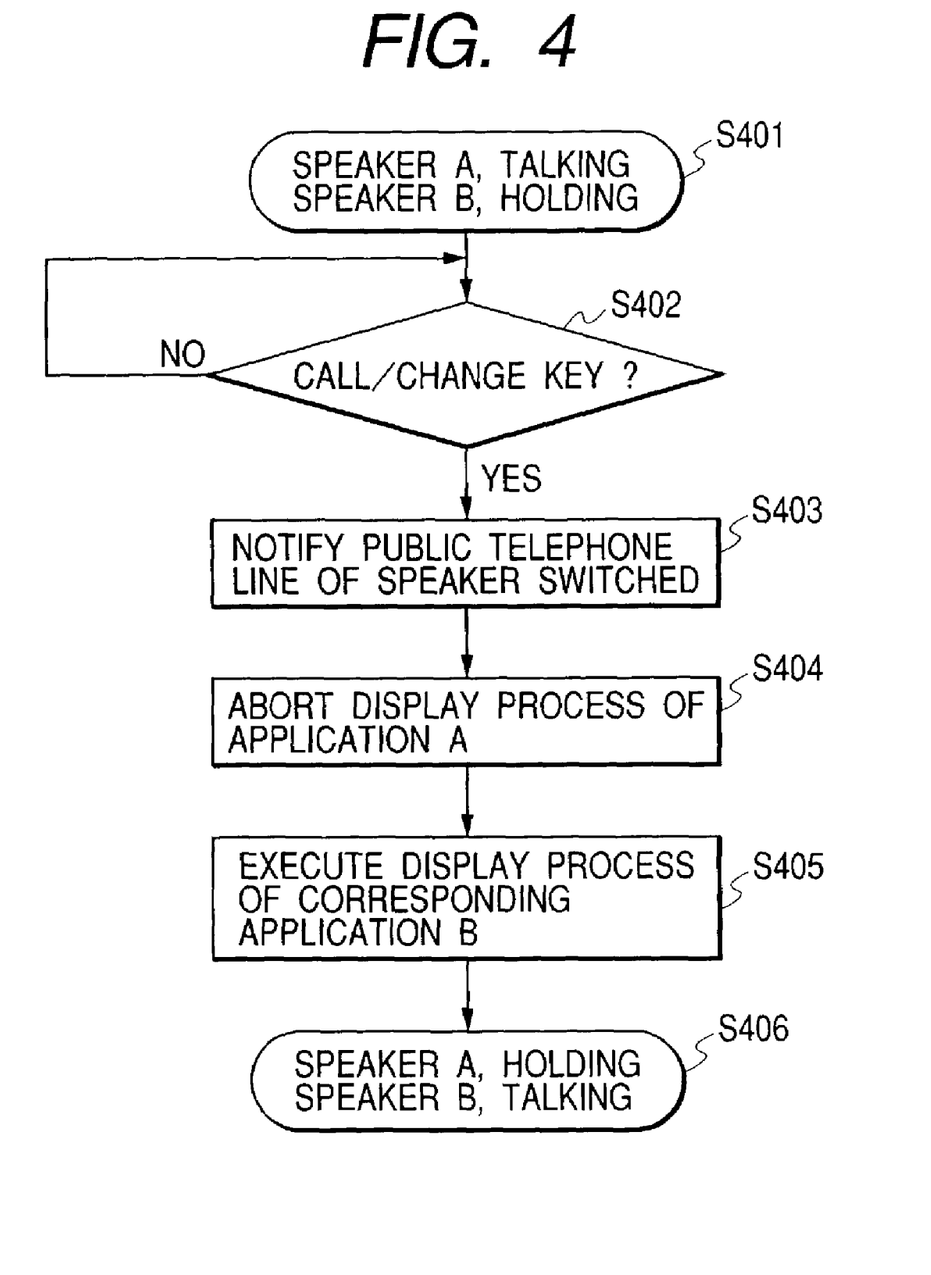
FIG. 4 is a flowchart of a first embodiment.

Referring to FIG. 4, there is shown a flowchart of an operation of the controller 102 of the portable terminal device 101 where the present invention is worked. This flowchart indicates a part of a program of the controller 102 stored in the RAM 106 or a ROM which is not shown. The controller 102 is a computer that reads and operates the program from the RAM 106 or the ROM which is not shown. The RAM 106 is a storage medium storing the program so that the controller 102 can read it out. This program can also be supplied externally, received from the wireless transceiver 104, and stored in the RAM 106. The following describes an operation of the portable terminal device 101 under a control of the controller 102.

It is assumed that the speaker A is associated with the E-mail application and that the speaker B is with the browser application as in the speaker-application correspondence table 107 in FIG. 3. A method of the correspondence will be described later.

If a screen of an incoming E-mail of the E-mail application is displayed on the display 108 during communication with the speaker A and the speaker B is holding the line (S401), the portable terminal device 101 notifies the public telephone network 202 of a speaker switched from the wireless transceiver 104 (S403) on detection of a depression of the call/change key 111 (S402).

Figure 5:
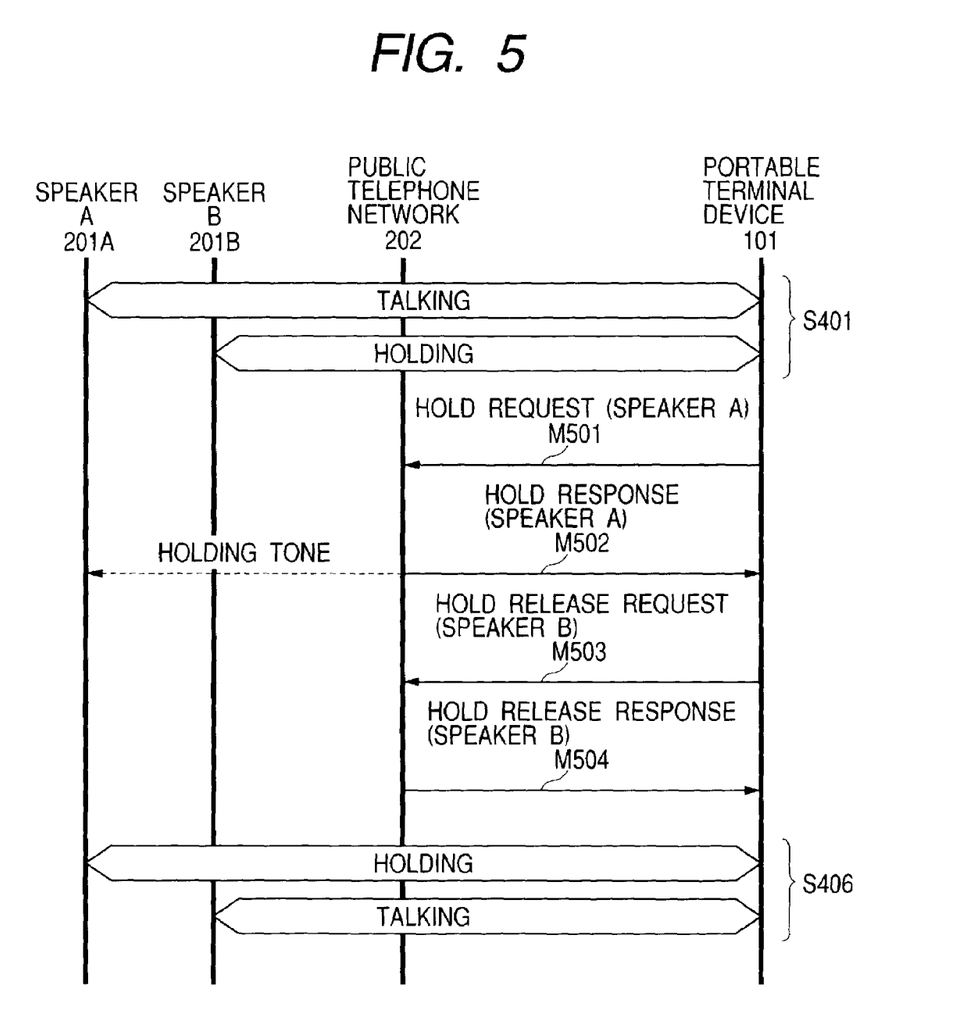
FIG. 5 is a sequence diagram of a notification of a switch of a speaker.

FIG. 5 shows a sequence of notifying the public telephone network 202 of the speaker switched.

In a condition at S401, a communication path is connected between the speaker A (201A) and the portable terminal device 101 and a holding tone is sent from the public telephone network 202 to the speaker B (201B).

For a notification of the speaker switched, a hold request (M501) is transmitted with specifying a call of the speaker A (201A) from the portable terminal device 101 to the public network. The public telephone network 202 that has received the hold request (M501) transmits a hold response (M502) to the portable terminal device 101 and sends out a holding tone to the speaker A (201A).

The portable terminal device 101 that has received the hold response (M502) from the public telephone network 202 specifies a call of the speaker B (201B) and transmits a hold release request (M503). The public telephone network 202 that has received the hold release request (M503) stops sending the holding tone to the speaker B (201B), connects the communication path between the speaker B (201B) and the portable terminal device 101, and sends a hold release response (M504) to the portable terminal device 101.

In this embodiment, the portable terminal device 101 transmitted two of the hold request (M501) and the hold release request (M503) to the public telephone network 202. In another arrangement, when the portable terminal device 101 transmits a speaker switch request, the public telephone network 202 performs both of holding operation of the speaker A (201A) and connecting the communication path between the speaker B (201B) and the portable terminal device 101.

After notifying the public telephone network 202 of the speaker switched, in other words, after receiving the hold release response (M504), the portable terminal device 101 aborts the display process of the incoming E-mail screen of the E-mail application (S404) and executes a display process of an application B corresponding to the speaker B, which is a browser application in this embodiment, with referencing the speaker-application correspondence table 107 (S405). While the screen display process of the E-mail application is aborted and the browser application screen is displayed here, it is also possible to display the browser application screen on the E-mail application screen.

Then, the browser application screen is displayed on the display 108 during communication with the speaker B and the line of the speaker A is put in the hold state (S406). The same operation is performed for switching from the speaker B to the speaker A. An Internet Web page is displayed on the browser application screen here.

The following describes a method of associating a speaker with an application.

Figure 6:
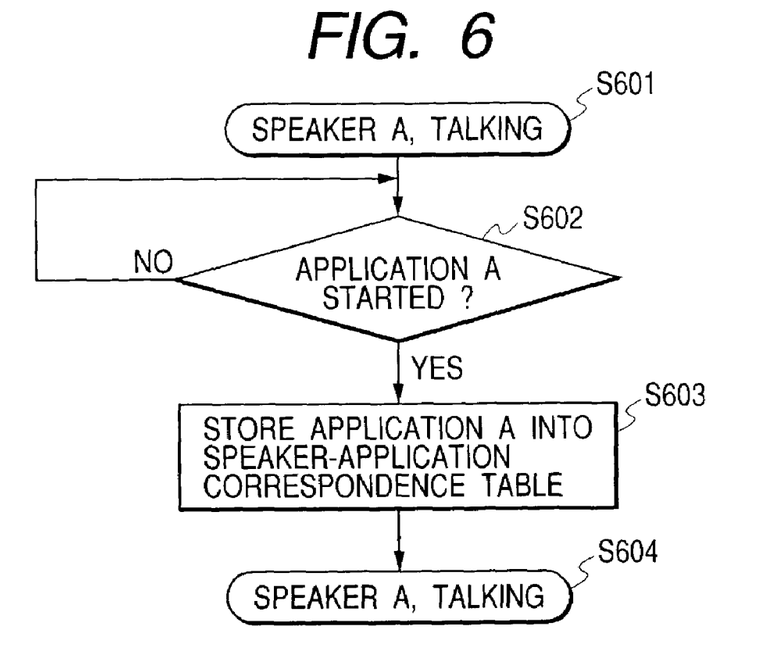
FIG. 6 is a flowchart of associating a speaker with an application.

Referring to FIG. 6, there is shown a flowchart of an operation of the controller 102 of the portable terminal device 101 in associating a speaker with an application. This flowchart shows a part of a program of the controller 102 stored in the RAM 106 or a ROM which is not shown. The controller 102 is a computer that reads and operates the program from the RAM 106 or the ROM which is not shown. The RAM 106 is a storage medium storing the program so that the controller 102 can read it out. In addition, this program can be supplied externally, received from the wireless transceiver 104, and stored in the RAM 106. The following describes an operation of the portable terminal device 101 under a control of the controller 102.

If an application A is started (S602) without correspondence between the speaker A and an application during communication with the speaker A, the application A is stored in a position corresponding to the speaker A in the speaker-application correspondence table 107 (S603). If an E-mail application is started by depressing the E-mail key 117 when no application is started during communication with the speaker A, for example, a code indicating the E-mail application is stored in a position corresponding to the speaker A in the speaker-application correspondence table 107. Furthermore, if an E-mail application is started by depressing the E-mail key 117 after another application is already started during communication with the speaker A, a code indicating the E-mail application is stored in the position corresponding to the speaker A in the speaker-application correspondence table 107, too.

In the same manner, if a browser application is started by depressing the Internet key 118 during communication with the speaker B, a code indicating the browser application is stored in a position corresponding to the speaker B in the speaker application correspondence table 107.

While an application corresponding to the speaker is stored at a start of the application here, it is also possible to store the application corresponding to the speaker who has not been switched yet at a switch of the speaker.

As set forth in the above, when an application is executed with a switch of a communication partner, the switch operation of the communication partner enables a display of an application screen corresponding to the communication partner without a switch operation of the application.

In the above example, (1) the browser application is executed during communication with the speaker B, (2) the communication partner is switched from the speaker B to the speaker A, (3) the E-mail application is executed during communication with the speaker A, and (4) when the communication partner is further switched from the speaker A to the speaker B, the display screen is switched to a screen of the browser application.

As set forth hereinabove, there has been noted a case where a speaker is switched when both of the speaker A and the speaker B are associated with applications, and the following describes a case where a speaker who is a switch destination is associated with no application.

Figure 7:
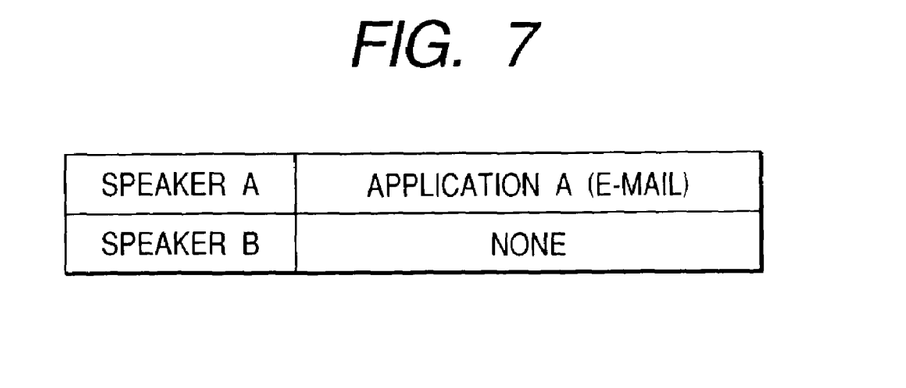
FIG. 7 is a diagram showing a speaker-application table 107 including a speaker B associated with no application.

Referring to FIG. 7, there is shown an example of a speaker-application correspondence table where the speaker B is associated with no application.

The following describes an embodiment in which a screen is not switched if a communication partner is changed from the speaker A to the speaker B when the speaker B is associated with no application.

Figure 8:
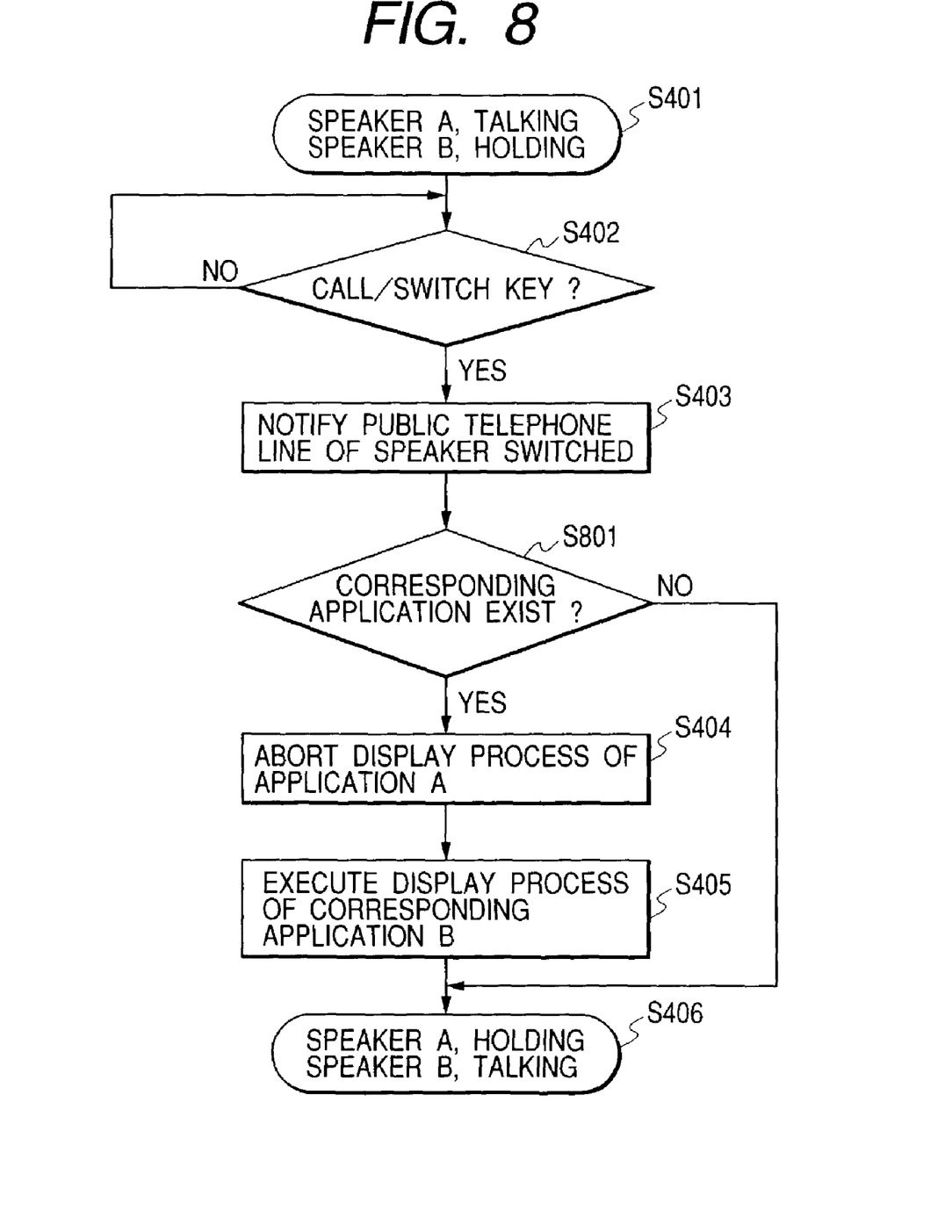
FIG. 8 is a flowchart of a second embodiment.

Referring to FIG. 8, there is shown a flowchart of an operation of the controller 102 of the portable terminal device 101 in this embodiment. This flowchart indicates a part of a program for the controller 102 stored in the RAM 106 or the ROM which is not shown. The controller 102 is a computer that reads and operates the program from the RAM 106 or the ROM which is not shown. The RAM 106 is a storage medium storing the program so that the controller 102 can read it out. In addition, this program can be supplied externally, received from the wireless transceiver 104, and stored in the RAM 106. The following describes an operation of the portable terminal device 101 under a control of the controller 102.

It is assumed that the speaker A is associated with an E-mail application and that the speaker B is associated with no application as shown in the speaker-application correspondence table in FIG. 7.

If a screen of an incoming E-mail of the E-mail application is displayed on the display 108 during communication with the speaker A and the speaker B is holding the line (S401), the portable terminal device 101 notifies the public telephone network 202 of a speaker switched (S403) on detection of a depression of the call/change key 111 (S402).

After notifying the public telephone network 202 of the speaker switched, the portable terminal device 101 does not switch the screen if there is no application corresponding to the speaker B with referencing the speaker-application table 107 (S801). In other words, it continues to perform the screen display of the application A.

If there is an application corresponding to the speaker B with referencing the speaker-application table 107, the processes in steps S404 and S405 are executed in the same manner as in FIG. 4.

As set forth in the above, when an application is executed with a switch of the communication partner, an application screen corresponding to the communication partner can be displayed only by a switch operation of the communication partner without a switch operation of the application and further an appropriate screen can be displayed even if a speaker who is a switch destination is associated with no application.

The following describes an embodiment in which a screen is switched to a normal call screen when a communication partner is switched from the speaker A to the speaker B with the speaker B associated with no application.

Figure 9:
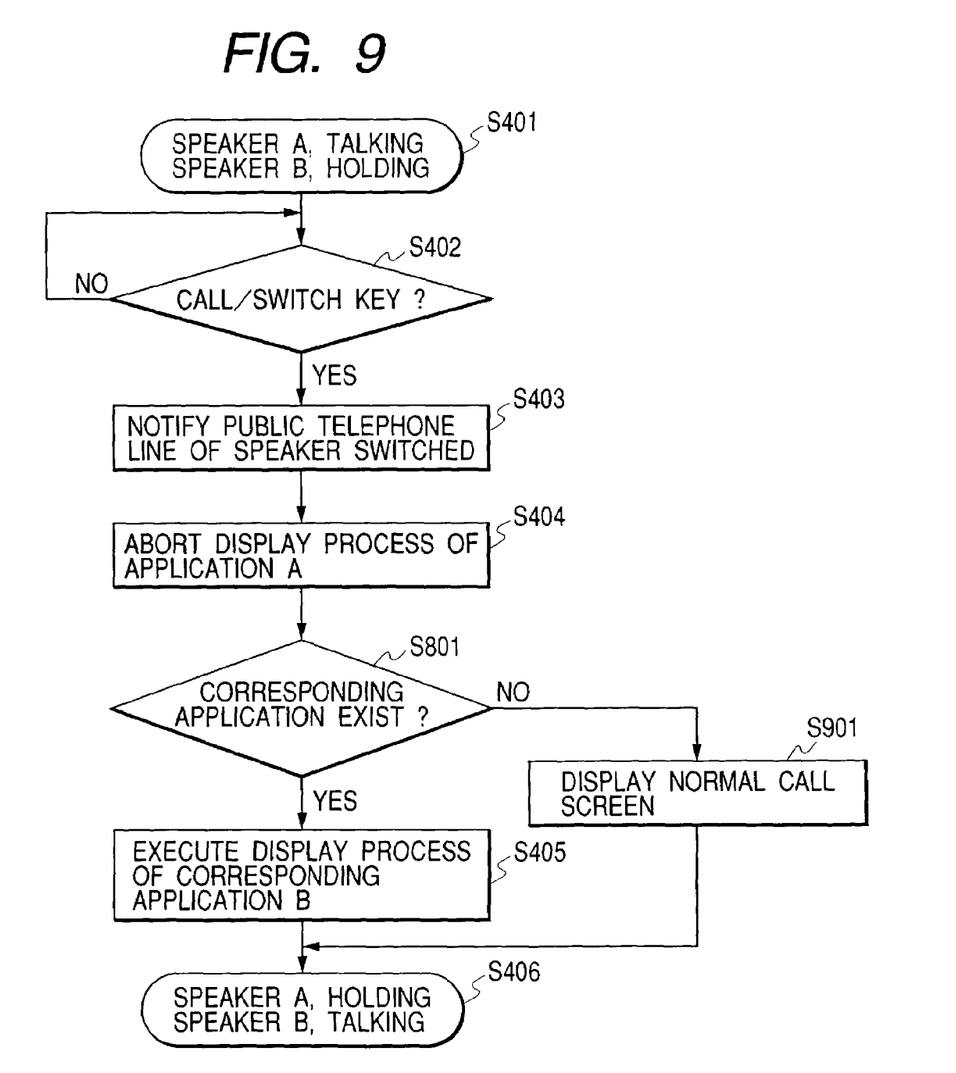
FIG. 9 is a flowchart of a third embodiment.

Referring to FIG. 9, there is shown a flowchart of an operation of the controller 102 of the portable terminal device 101 according to a third embodiment. This flowchart indicates a part of a program for the controller 102 stored in the RAM 106 or a ROM which is not shown. The controller 102 is a computer that reads and operates the program from the RAM 106 or the ROM which is not shown. The RAM 106 is a storage medium storing the program so that the controller 102 can read it out. In addition, the program can be supplied externally, received from the wireless transceiver 104, and stored in the RAM 106. The following describes an operation of the portable terminal device 101 under a control of the controller 102.

It is assumed that the speaker A is associated with the E-mail application and that the speaker B is associated with no application as shown in the speaker-application correspondence table in FIG. 7.

If a screen of an incoming E-mail of the E-mail application is displayed on the display 108 during communication with the speaker A and the speaker B is holding the line (S401), the portable terminal device 101 notifies the public telephone network 202 of a speaker switched (S403) on detection of a depression of the call/change key 111 (S402).

After notifying the public telephone network 202 of the speaker switched, the portable terminal device 101 aborts a display process of the E-mail screen of the E-mail application (S404) and it displays a normal call screen (S901) if there is no application corresponding to the speaker B with referencing the speaker-application table (S801). This normal call screen is displayed at a start of a call with a certain communication partner and it is a screen displayed before an application is started or after an application under execution is terminated during communication. While the display process of the E-mail application screen is aborted and the call screen is displayed in this embodiment, it is also possible to display the call screen on the E-mail application screen.

For example, the display 108 displays a normal call screen at a start of communication with the speaker A. At this point, if the E-mail application is started with an operation of the E-mail key 117, an E-mail receiving screen is displayed. With this, it is stored that the application corresponding to the speaker A is the E-mail application in the speaker-application correspondence table 107.

Then, if the portable terminal device receives an incoming call from the speaker B, it displays the normal screen including a number (or a name) of the speaker B. If a user of the portable terminal device 101 operates the call/change key 111, a communication partner is changed from the speaker A to the speaker B. Afterward, if the communication partner is changed from the speaker B to the speaker A again without a start of an application, the portable terminal device displays an E-mail receiving screen which is the application corresponding to the speaker A on the display 108 with referencing the speaker-application correspondence table 107.

In this condition (S401), if the communication partner is changed from the speaker A to the speaker B again, the portable terminal device changes the display on the display 108 from the E-mail screen which is the application corresponding to the speaker A to the normal screen which had been displayed during communication with the speaker B in the above (S404, S901). Naturally, if an application corresponding to the speaker B is registered, a screen of the application is displayed. It should be noted, however, that the switch of the screen is made when the speaker B is holding the line in a standby state, but not if the speaker B disconnects the call.

In an embodiment of the present invention, the portable terminal device displays information of a communication partner, for example, a phone number of the communication partner or a name thereof on the normal call screen. In another embodiment, it displays duration of a call or a call rate. In still another embodiment, it displays the current time. In a further embodiment, it displays two kinds of information displayed on the normal call screen in the above or more of the information.

If there is an application corresponding to the speaker B with referencing the speaker-application table 107, the processes in the steps S404 and S405 are performed in the same manner as in FIG. 4.

As set forth hereinabove, when an application is executed with a switch of a communication partner, the switch operation thereof enables a display of an application screen corresponding to the communication partner without a switch operation of the application and further enables a display of an appropriate screen even if a speaker who is a switch destination is associated with no application.

Although the present invention has been described in its preferred embodiments, it is to be understood that the invention is not limited to the above embodiments, but applicable to communication apparatuses having no radio communication function. In a communication apparatus capable of using two lines, a communication partner can be changed without a network service. The present invention is also applicable to this type of communication apparatus and other various modifications can be made within the scope of the appended claims of the invention.

What is claimed is:

1. A communication apparatus comprising:
   display means for performing a display;
   detecting means for detecting an application selected manually by a user;
   storage means for storing the application selected manually during a first communication with a second partner, the first communication being performed prior to a communication with a first partner; and
   control means for controlling, when a second communication with the second partner is resumed after the communication with the first partner, said display means to perform the display of the application selected manually during the first communication with the second partner and stored by said storage means in accordance with a switch of communication from the first partner to the second partner, for the second communication with the second partner.

2. An apparatus according to claim 1, wherein said display means continues to perform a first display of a first application corresponding to the first partner in a case where a second application corresponding to the second partner is not stored by said storage means.

3. An apparatus according to claim 1, wherein said display means performs a third display which is different from a first display of a first application corresponding to the first partner in a case where a second application corresponding to the second partner is not stored by said storage means.

4. An apparatus according to claim 1, wherein the application corresponding to the second partner is an E-mail application.

5. An apparatus according to claim 1, wherein the application corresponding to the second partner is a browser application.

6. An apparatus according to claim 1, wherein said storage means stores the application corresponding to the second partner of a speech communication, and said control means controls said display means to perform the display of the application corresponding to the second partner in accordance with the switch of the communication partner of a speech communication from the first partner to the second partner.

7. An apparatus according to claim 1, wherein said control means notifies a network of the switch of the communication partner.

8. An apparatus according to claim 1, wherein said storage means stores a link between the application and the second partner, and said control means controls said display means to perform the display of the application corresponding to the second partner in accordance with the link stored in said storing means.

9. An apparatus according to claim 1, wherein said control means controls said display means to switch the display of a second application corresponding to the first partner to the display of the application corresponding to the second partner in accordance with the switch of the communication partner from the first partner to the second partner.

10. A program for controlling a display of a communication apparatus, the program comprising program steps of:
    detecting an application selected manually by a user;
    storing an application selected manually during a first communication with a second partner, the first communication being performed prior to a communication with a first partner; and
    controlling, when a second communication with the second partner is resumed after communication with the first partner, the display to perform the display of the application selected manually during the first communication with the second partner and stored in said storing step in accordance with switch of a communication from the first partner to the second partner, for the second communication with the second partner.

11. A program according to claim 10, wherein the application corresponding to the second partner is an E-mail application.

12. A program according to claim 10, wherein the application corresponding to the second partner is a browser application.

13. A program according to claim 10, wherein said storing step includes storing the application corresponding to the second partner of a speech communication, and said display step includes controlling the display to display the application corresponding to the second partner in accordance with the switch of a communication partner of a speech communication from the first partner to the second partner.

14. A program according to claim 10, wherein said controlling step includes notifying a network of the switch of the communication partner.

15. A program according to claim 10, wherein a link between the application and the second partner is stored in said storing step, and the display of the application corresponding to the second partner is performed in said controlling step in accordance with the link stored in said storing step.

16. A program according to claim 10, wherein the display of a second application corresponding to the first partner is switched to the display of the application corresponding to the second partner in said controlling step in accordance with the switch of the communication partner from the first partner to the second partner.

17. A method for controlling a display of a communication apparatus, the method comprising the steps of:

detecting an application selected manually by a user;

storing an application selected during a first communication with a second partner, the first communication being performed prior to a communication with a first partner; and controlling, when a second communication with the second partner is resumed after communication with the first partner, the display to perform the display of the application selected manually during the first communication with the second partner and stored in said storing step in accordance with a switch of communication from the first partner to the second partner, for the second communication with the second partner.

18. A method according to claim 17, wherein the application corresponding to the second partner is an E-mail application.

19. A method according to claim 17, wherein the application corresponding to the second partner is a browser application.

20. A method according to claim 17, wherein said storing step includes storing the application corresponding to the second partner of a speech communication, and said controlling step includes controlling the display to display the application corresponding to the second partner in accordance with the switch of a communication partner of a speech communication from the first partner to the second partner.

21. A method according to claim 17, wherein said controlling step includes notifying a network of the switch of the communication partner.

22. A method according to claim 17, wherein a link between the application and the second partner is stored in said storing step, and the display of the application corresponding to the second partner is performed in said controlling step in accordance with the link stored in said storing step.

23. A method according to claim 17, wherein the display of a second application corresponding to the first partner is switched to the display of the application corresponding to the second partner in said controlling step in accordance with the switch of the communication partner from the first partner to the second partner.

* * * * *